United States Patent
Daniels et al.

(10) Patent No.: US 6,598,097 B1
(45) Date of Patent: Jul. 22, 2003

(54) METHOD AND SYSTEM FOR PERFORMING DMA TRANSFERS USING OPERATING SYSTEM ALLOCATED I/O BUFFERS

(75) Inventors: Scott Leonard Daniels, Cedar Park, TX (US); Bruce Gerard Mealey, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/515,593

(22) Filed: Feb. 29, 2000

(51) Int. Cl.[7] ............................................. G06F 13/28
(52) U.S. Cl. ..................................................... 710/22
(58) Field of Search ............................. 710/20, 22, 23, 710/27, 28, 52, 74, 107, 112; 711/105, 111, 150, 146; 370/537; 712/225

(56) References Cited

U.S. PATENT DOCUMENTS

| | | | | |
|---|---|---|---|---|
| 5,394,526 A | * | 2/1995 | Crouse et al. ............... 395/200 |
| 5,619,720 A | * | 4/1997 | Garde et al. ................. 395/800 |
| 5,634,076 A | * | 5/1997 | Garde et al. ................... 710/22 |
| 5,685,005 A | * | 11/1997 | Garde et al. ................. 395/800 |
| 5,701,482 A | * | 12/1997 | Harrison et al. ............. 709/105 |
| 6,049,841 A | * | 4/2000 | Fields, Jr. et al. ............ 710/28 |
| 6,310,898 B1 | * | 10/2001 | Schwartz ...................... 370/537 |

* cited by examiner

Primary Examiner—Jeffrey Gaffin
Assistant Examiner—RiJue Mai
(74) Attorney, Agent, or Firm—Volel Emile; Bracewell & Patterson, L.L.P.

(57) ABSTRACT

A method and system for performing direct memory access (DMA) transfers using operating system allocated I/O buffers provides a mechanism for device to device transfers without utilizing global system memory. Memory is allocated on a local bus to which both devices have a requested degree of affinity and transfers are performed to and from this memory. Operating system routines provide for selection of global system memory or local memory based on whether there is local memory available to which both devices have a requested degree of affinity. The memory can be deallocated after each transfer and reallocated for each subsequent transfer.

24 Claims, 4 Drawing Sheets

METHOD AND SYSTEM FOR PERFORMING DMA TRANSFERS USING OPERATING SYSTEM ALLOCATED I/O BUFFERS

BACKGROUND OF THE INVENTION

1. Technical Field

The present invention generally relates to computer systems, and more particularly to operating systems and hardware for performing Direct Memory Access (DMA) transfers.

2. Description of the Related Art

As computer systems have evolved, peripheral devices and subsystems coupled to the central processing unit (CPU) have likewise evolved. This evolution for peripheral devices has included the ability to direct and perform transactions with a connecting bus independent of CPU action. Direct Memory Access(DMA) controllers have also been provided in computer systems for off-loading transaction work from the CPU to a dedicated controller, in order to increase the availability of the CPU to perform computational tasks and other tasks that are slowed by the use of the CPU to perform input/output (I/O) transfers.

Computer systems typically provide at least one system bus and a system memory area that is predominantly used by one or more processors for computation and data manipulation. I/O is sometimes performed by the processor, but can be performed by DMA controllers that transfer data to and from devices into system memory. The DMA controllers free the processor from I/O tasks and usually perform transfers more efficiently. DMA transfers can also be performed by the devices themselves. This type of device is referred to as a "bus master" because it is capable of acquiring a bus and transferring data directly to and from memory or devices located on the bus.

A DMA input device transfers data to memory or this transfer may be accomplished with the action of a separate DMA controller. A DMA output device transfers data from memory and the transfer may likewise be accomplished by the action of a separate DMA controller. The application software or device driver is able to perform data communication with the device by writing or reading the data to or from memory and signaling the device or DMA controller to perform the transfer.

A DMA transfer can also be performed from one device to another device using two discrete DMA transfers, one writing to memory and the second reading from memory. The input device data is transferred to system memory from the input device by a DMA controller or by the input device if it is a bus master. This is often referred to as a DMA write, because the data is being written to system memory. The output device data is then transferred from system memory to the output device by a DMA controller or the output device if it is a bus master. This is often referred to as a DMA read because system memory is being read. The data is usually modified by the processor after the DMA write and before the DMA read, while the data is located in system memory. Because the format of data for different devices is generally dissimilar, the processor intervenes to reformat the data. Thus the processor must be able to access the data in order to for example, read an image from an image scanner and save that image to disk in a different format.

In some cases, formatting may only require the addition of some header information, for example, a TIFF (Tagged Image File Format) compatible scanner may produce an almost complete TIFF file, without record information required at the header of the file. In this case, information must be added to the image in memory. Or, for another example, a network adapter might transfer fileoriented data that could be saved to a storage device, but information at the start of the data might be associated with the transfer and should not be stored. In this case, information must be removed from the memory image that is transferred to the storage device.

DMA input and output place a bandwidth burden on a computer system, in that the DMA transfers take up a portion of the available system bus bandwidth, which reduces the amount of access the processor has to memory and other devices, reducing computer system performance. The buffer also ties up a portion of system memory, making it unavailable for use by other processes during the transfer. Memory can be located on buses other than the global system bus, but this is not typically used for DMA transfers because applications or drivers do not have information about this memory, the memory may be optionally attached and the operating system does not provide flexibility to handle this optional connection when allocating DMA buffers, or the device or devices involved in a DMA transfer may not be able to access a particular memory.

Operating system services for allocating DMA buffers typically allocate global system memory for this purpose, locking an area so that a DMA controller or bus master may perform read or write transfers into a buffer. Because the operating system services for allocating DMA buffers must treat the general case, global system memory is used for these transfers.

It would therefore be desirable to improve computer systems and operating system software so that DMA transfers from device to device do not reduce processor throughput and available global system memory. It would further be desirable to provide these improvements in such a fashion that device to device transfers can be accomplished while allowing a processor to modify the data being transferred.

SUMMARY OF THE INVENTION

It is therefore one object of the present invention to provide an improved computer system that can transfer data from input device to output device without using global system memory.

It is another object of the present invention to provide such an improved computer system that can optionally utilize global system memory for the data transfer if local memory, including on-board adapter memory, is not available.

It is another object of the present invention to provide such a computer system wherein a processor can modify the data that is transferred from an input device to an output device.

The foregoing objects are achieved in a method for performing DMA transfers in a computer system having global system memory, a system bus, and at least one processor that determines that local memory coupled to a local bus is available with a degree of efficiency with a first device, and if local memory is available, allocating a buffer from it and transferring data between the buffer and the first device. The method may further receive a request for allocation of a DMA buffer containing a first affinity level corresponding to the first device and the degree of efficiency can be determined in conformance with the first affinity level. The method may further determine that the local memory has a second degree of efficiency with a second device and transfer data between the second device and memory. The method may further include modifying the data after a transfer from the first device and before the transfer to the second device.

The local memory may be memory coupled to a local bus separated from the system bus by a bridge and coupled to the first and second devices, and the determination of efficiency may be based on a determination of these connections. The method may further deallocate the buffer after the transfer to the second device. The devices may be bus masters or the method may use DMA controllers and the method may be performed in response to receiving a request for a DMA buffer.

The method may be embodied in a computer system including means for performing each of the steps of the method or in a computer program product with media containing program instruction for execution in a computer system for performing the steps of the method.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like numbers correspond to like elements and further:

DESCRIPTION OF THE ILLUSTRATIVE EMBODIMENTS

Figure 1:
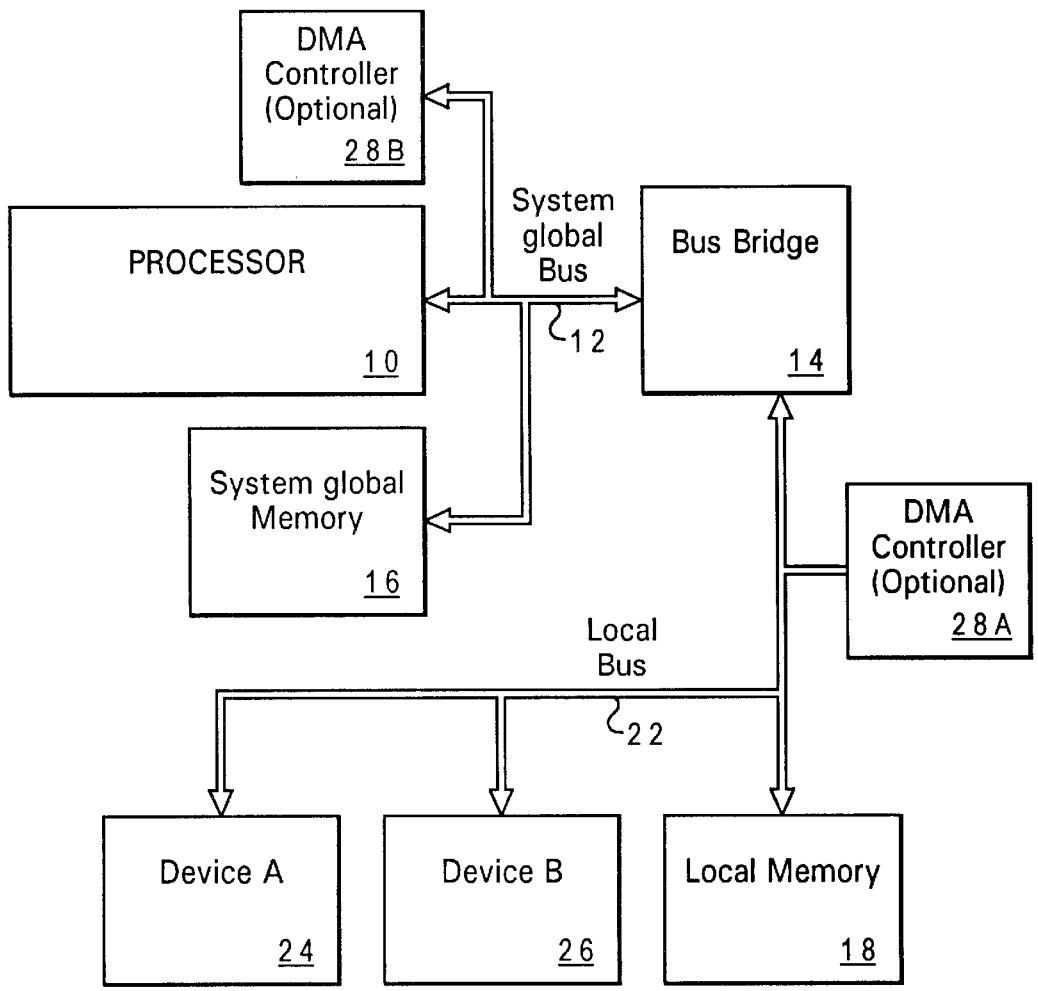
FIG. 1 is a block diagram of computer system core components and peripheral devices in which the present invention may be practiced.

With reference now to the figures, and in particular with reference to FIG. 1, the core components of a computer system in which the present invention may be practiced are depicted in block diagram form.

Processor 10, is coupled to system global memory 16, (which may include cache memories as well as planar memory arrays), by system global bus 12. Optional DMA controller 28B is coupled to system global bus 12, and optional DMA Controller 28A is coupled to local bus 22. Bus bridge 14, couples local bus 22 to system global bus 12, which may be a local PCI (peripheral component interconnect) or PCMCIA (Personal Computer Memory Card International Association) bus that connects peripheral device A 24, device B 26 and bus bridge 14. Other buses such as Fiber Channel Interconnect (FCI) and IEEE 1394 ("Firewire") may also be used in such a manner.

This hardware architecture has been capable of supporting direct DMA transfers from device to device for some time, and device to local memory 18 transfers can likewise be accomplished. In addition, a peripheral connected to local bus 22 can transfer data via direct memory access (DMA) to system memory 16 through bus bridge 14, which is designed to translate transactions on local bus 22 to transactions on system global bus 12. However, operating system software has required that transfers occur within global system memory space, since the DMA allocation routines allocate memory from global system memory 16 that is accessible to all of the devices coupled to system global bus 12.

It is preferred that the devices be bus masters, so that they may generate the transactions locally, or that bus bridge 14 is provided with a DMA controller capability as is found in some bridge designs. Another alternative is to couple a DMA Controller 28A to local bus 22. In this manner, a DMA transaction can be made between non-bus master devices and memory without causing transactions to occur on system global bus 12. Although DMA controllers 28 are not necessary to practice the invention, they can form part of an embodiment wherein the devices exchanging data with memory are not bus masters and therefore need an external controller to perform DMA transfers.

A DMA controller 28B in an alternative location, may be coupled to the system global bus 12 and perform transfers between devices 24, 26 on local bus 22 and either local memory 18 or global system memory 16. Transactions with local memory 18 are performed by DMA controller 28B creating transactions on system global bus 12, that are translated by bus bridge 14 into local bus 22 transactions. Therefore bus bridge 14 is actually performing the transaction and DMA Controller 28B is providing a stimulus causing bus bridge to recognize the transaction is occurring at least partially on local bus 22. Use of a DMA controller 28B on system global bus 12, does not provide the bus isolation benefit of the present invention, as it will generate activity on system global bus 12 for transactions occurring between devices and/or memory on local bus 22, but the use of local memory 18 still provides some benefit by not requiring the allocation of a buffer from global system memory 16.

The present invention includes improved DMA allocation routines in the kernel of the operating system. The kernel contains low level control routines that control the interaction of hardware and software in a computer system. It also can obtain information about the computer system hardware at initialization and sometimes dynamically when the computer hardware or software configuration changes. The kernel is also responsible for memory management: allocation and deallocation of blocks of memory to software running in the computer.

The kernel allocation routines include the use of "affinity" requests associated with the allocation. Affinity is a description of bus proximity of the devices involved in the transfer to the memory to be allocated, including any processor that must modify the data. The affinity of an adapter to memory is a measure of the efficiency with which transfers of data between that adapter and memory can be performed. This efficiency may be in terms of faster data transfer rates or throughput, but may take into consideration the beneficial effect of removing the bus transactions from the global system bus or a higher level bus in a multi-tiered bus system. The affinity to each adapter and the processor may be specified as a value such as HIGH_AFFINITY, LOW_AFFINITY or NO_AFFINITY. A value of HIGH_AFFINITY indicates that the memory is either on the same bus, or a bus proximate to the device or processor, or on the adapter itself. If the memory is on the adapter itself, it is possible for the adapter to provide an on-board connection or adapter bus, wherein the adapter may access data in the memory without generating any off-adapter traffic at all. The processor can still access this memory if it is provided as feature memory whereby the memory on the adapter is mapped onto the local bus. For the case of NO_AFFINITY specified for the processor, it is indicated that the processor will not have to modify the data at all. In this case, the transfers between two devices may take place without the processor reformatting the data being transferred. Since it is the application code that is requesting allocation of the DMA buffer and directing transfers between devices, knowledge of data compatibility must be determined by the application.

The kernel keeps track of the affinity of each of the DMA devices to particular local memory 18 (I/O memory buffers), as well as the affinity to global system memory 16. The kernel routine for mapping DMA memory to devices takes a DMA descriptor structure as an input argument. This DMA descriptor contains a list of specifiers or "affinity list" for at least one DMA device and the processor and may contain descriptors for multiple devices. The affinity information used by the kernel is built at system startup and generally includes nodal connectivity information for devices and buses in a system organized in a tree structure. For instance, the tree structure contains information describing which devices and connections to other buses (bridges) are connected to each bus, and which processors and memory are connected to those buses.

For example, if a transfer is to take place between a storage device and a network adapter and the processor must make changes to data read from the storage device before it can be written to the network adapter (which is usually the case), the network adapter, the storage device, and the processor will all be included in the affinity list for the DMA allocation request with an affinity value other than NO_AFFINITY. As another example, if the data stored on the storage device can be directly "spooled" to the network adapter, then the processor affinity entry could have a value of NO_AFFINITY and the transaction could take place between the storage device and the network adapter on a local bus, leaving the processor completely unburdened by the transaction, and the local DMA buffer memory would not have to be memory that is even accessible to the processor. In some cases where an adapter contains the buffer that is allocated for the transfer, the device may be able to access the buffer directly (i.e. using an internal adapter bus), without requiring a second transfer across the local bus, further improving performance.

When allocating a buffer for DMA transfers, the kernel mapping routines examine the affinity list and a system-maintained information structure that describes memory relationships to other devices in the system. The kernel routines compare the affinity list and determine if a local buffer can be allocated. If not, a buffer in global system memory is used, with a concomitant penalty in global bus availability.

Figure 2:
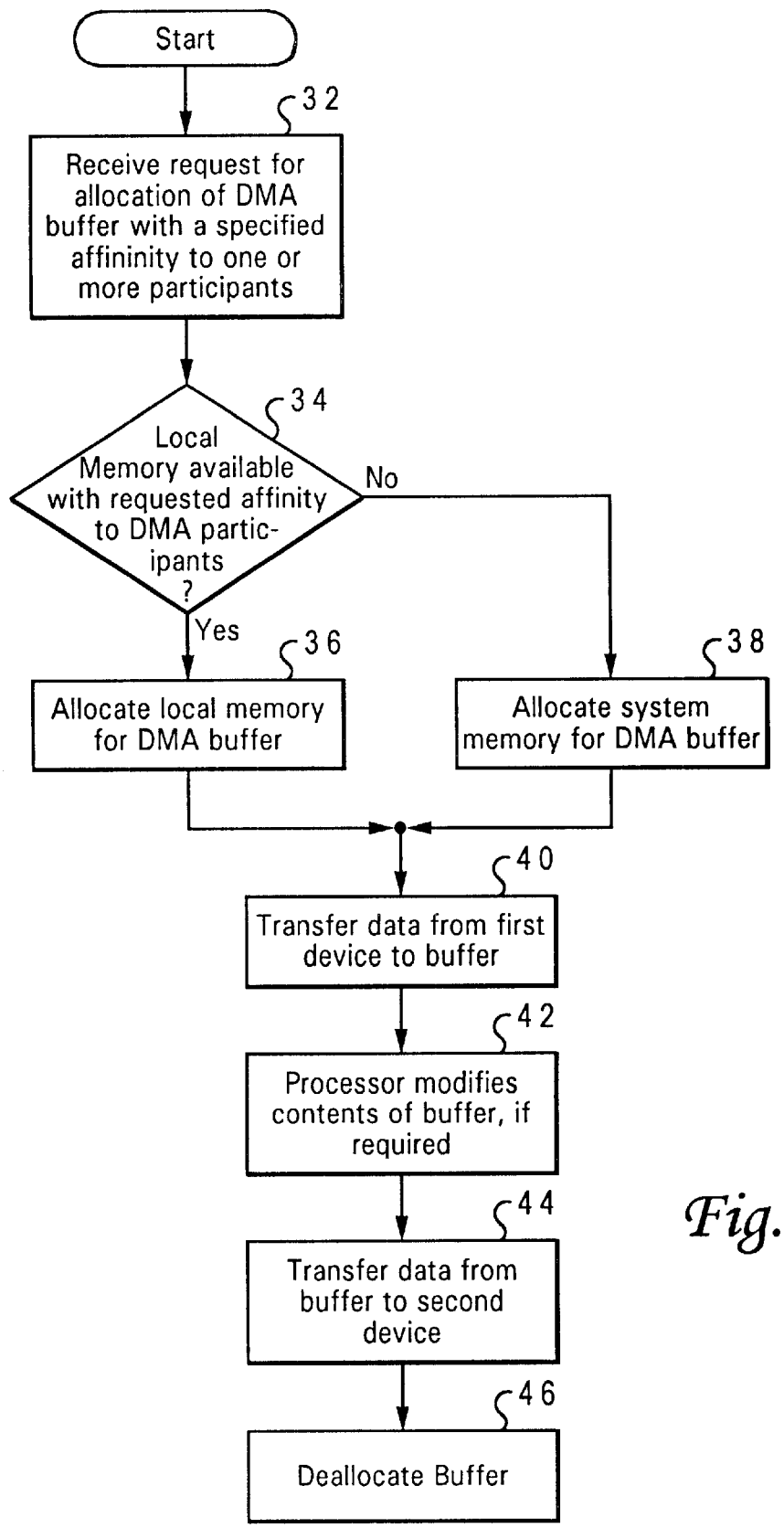
FIG. 2 is a flow diagram of an embodiment of the method of the present invention.

Referring now to FIG. 2, there is depicted an embodiment of the method of the present invention. The kernel receives a request for allocation of a DMA buffer (step 32), including information about one or more devices which require affinity to the buffer. The kernel checks its affinity information, and determines if local memory is available with affinity to the DMA participants (step 34). If local memory is available, the DMA buffer is allocated from local memory (step 36). If it is not available, the buffer is allocated from global system memory (step 38). Data is then transferred from the first (source) device to the buffer (step 40) if a DMA read is involved. Subsequently, the processor modifies the contents of the buffer, if needed for the transfer (step 42). Next, data is transferred from the buffer to a second (sink) device if a DMA write is part of the transaction (step 44). Finally, the buffer is deallocated if the buffer is not allocated as part of a persistent transfer scheme wherein the buffer will be reused numerous times (step 46).

Figure 3:
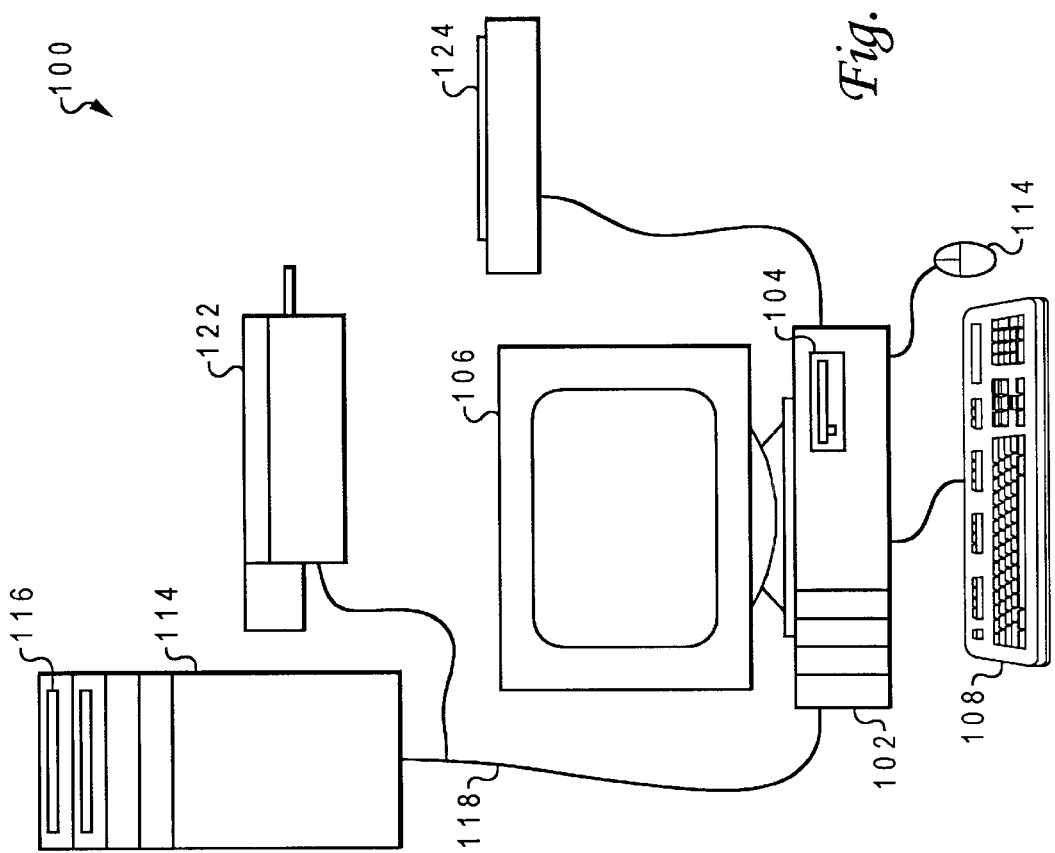
FIG. 3 is a pictorial diagram of a computer system in which the present invention can be practiced.

The method of the present invention will be generally implemented by a computer executing a sequence of program instructions for carrying out the steps of the method and may be embodied in a computer program product comprising media storing the program instructions. Referring to FIG. 3, a computer system 100 is depicted on which the method of the present invention may be carried out. Processing unit 102, houses a processor, memory and other systems components that implement a general purpose processing system that may execute a computer program product comprising media, for example a floppy disc that may be read by processing unit 102 through floppy drive 104. The program product may also be stored on hard disk drives within processing unit 102 or may be located on a remote system 114 such as a server, coupled to processing unit 102, via a network interface, such as an ethernet interface. Monitor 106, mouse 114 and keyboard 108 are coupled to processing unit 102, to provide user interaction. Scanner 124 and printer 122 are provided for document input and output. Printer 122, is shown coupled to processing unit via a network connection, but may be coupled directly to processing unit 102. Scanner 124 is shown coupled to processing unit 102 directly, but it should be understood that peripherals may be network coupled or direct coupled without affecting the ability of workstation computer 100 to perform the method of the invention.

Figure 4:
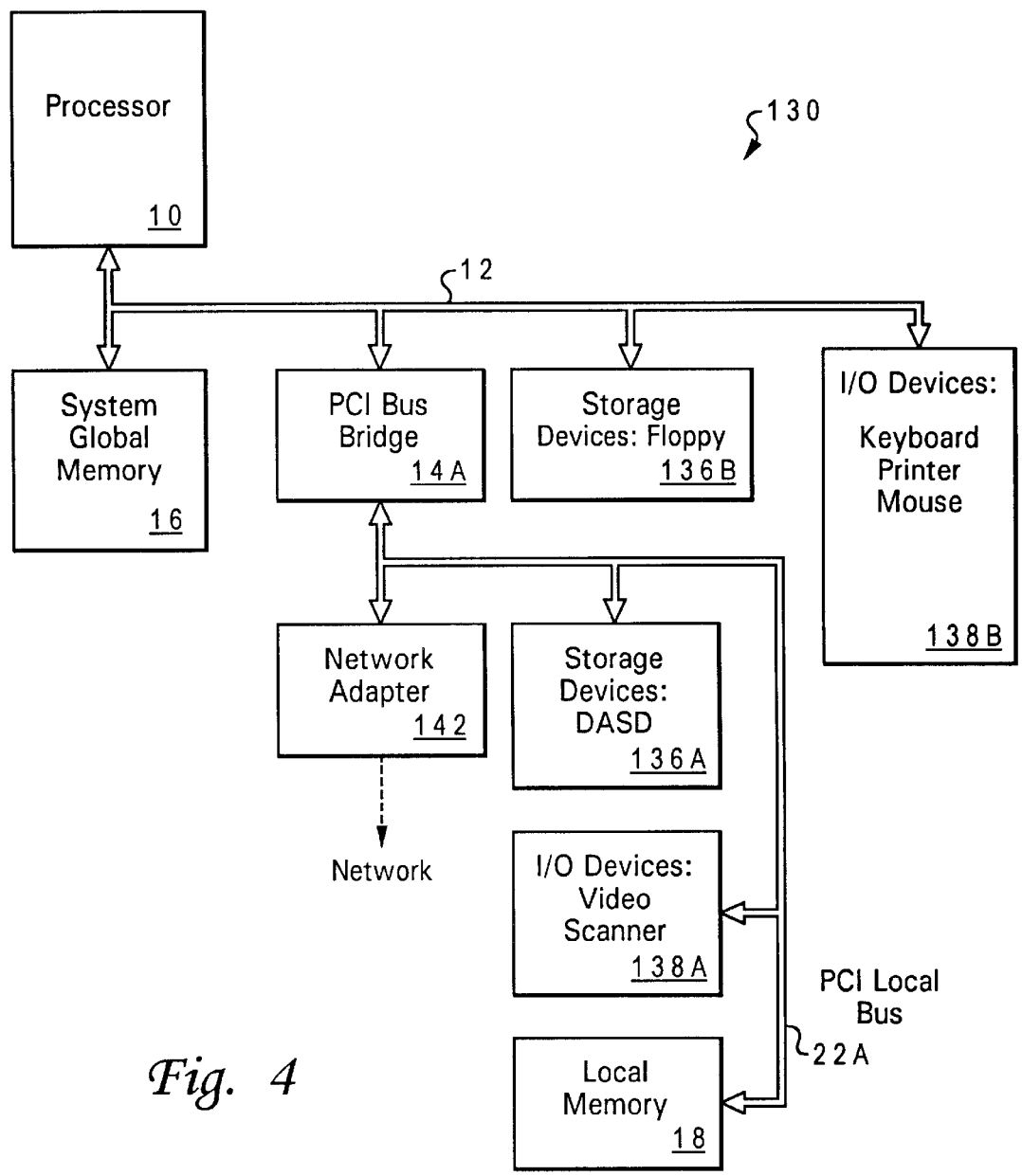
FIG. 4 is a block diagram of a computer system showing a relationship of components in of FIG. 3.

Referring now to FIG. 4, an organization of components within processing unit 102 forming a processing system 130 is shown. Processor 10 executes sequences of program instructions stored in system global memory 16, coupled to processor by system bus 12. The program instructions in memory are typically loaded from storage devices such as Direct Access Storage Devices (hard discs) 136A, shown coupled to PCI local bus 22A, or floppy disc 136B shown coupled to system bus 144. The program instructions may also be loaded from a network via network adapter 142, or the program instructions may be executed on remote system 116 and processing system 130 may provide only a user interface. I/O devices 138 such as video displays, printers, keyboards, mice and scanners are coupled through electrical or other interfaces to bus 144 for providing user input and output.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. For example, the techniques of the present invention could be adapted to create transfers from device to device where the local memory is actually present in the one or more devices. It is therefore contemplated that such modifications can be made without departing from the spirit or scope of the present invention as defined in the appended claims.

What is claimed is:

1. A method for performing direct memory access (DMA) transfers in a computer system having global system memory, a global system bus, at least one processor, and at least one local bus, comprising:

receiving a request for a DMA buffer allocation containing a first affinity level corresponding to a first device, and said degree of efficiency is determined in conformance with said first affinity level;

determining that a local memory coupled to a given local bus is available with a degree of efficiency with said first device;

responsive to said determination, allocating a buffer in said local memory; and first transferring data between said local memory and said first device.

2. The method of claim 1, wherein said request contains a second affinity level corresponding to a second device, and said determining step further determines that said local memory has a second degree of efficiency with a second device, and further comprising the step of second transferring data between said local memory and said second device.

3. The method of claim 2, further comprises the step of responsive to completion of said first transferring step, modifying data in said buffer before performing said second transferring step.

4. The method of claim 2, wherein said first device and said second device and said local memory are coupled to a local bus separated from said global system bus by a common bus bridge and said determining step determines that said local memory has high efficiency with said first device and high efficiency with said second device in conformity with the coupling of said first device and said second device to said given local bus.

5. The method of claim 2, further comprising the step of deallocating said buffer responsive to the completion of said second transferring step.

6. The method of claim 1, wherein said first device is a bus master and said first transferring step comprises said first device performing transfers with said local memory.

7. The method of claim 1, wherein said computer system further comprises DMA controller means coupled to said local bus and said first transferring step comprises said DMA controller means transferring data between said first device and said local memory.

8. A computer system, having global system memory, a global system bus, at least one processor, further comprising:

determining means for determining that local memory coupled to a local bus and separated from said global system bus is available with a degree of efficiency with a first device, and for determining said degree of efficiency in response to receiving a request for a DMA buffer allocation containing an affinity level corresponding to said first device;

allocating means for allocating a buffer in said local memory, said allocating means allocating said buffer in response to an indication provided from said determining means; and first transfer means for transferring data between said local memory and said first device.

9. The computer system of claim 8, wherein said determining means further determines that said local memory has a second degree of efficiency with a second device and further comprising second transfer means for transferring data between said local memory and said second device.

10. The computer system of claim 9, further comprising modifying means for modifying data in said buffer before performing said second transferring step, said modifying means modifying said data in response to said first transfer means completing a transfer.

11. The computer system of claim 9, wherein said first device and said second device and said local memory are coupled to a local bus separated from said global system bus by a common bus bridge and said determining means determines that said local memory has high efficiency with said first device and a high affinity with said second device in conformity with the coupling of said first device and said second device to said local bus.

12. The computer system of claim 9, further comprising means for deallocating said buffer responsive to said second transfer means completing a transfer.

13. The computer system of claim 8, wherein said first device is a bus master and said first transfer means is incorporated into said first device.

14. The computer system of claim 8, wherein said first transfer means comprises DMA controller means coupled to said local bus.

15. A computer program product, for use in a general purpose computing system having global system memory, a global system bus, at least one processor, comprising:

a computer-readable storage medium; and program instructions stored on said storage medium for:

receiving a request for a DMA buffer allocation containing a first affinity level corresponding to said first device and degree of efficiency is determined in conformity with said first affinity level;

determining that local memory coupled to a local bus is available with a degree of efficiency with a first device;

responsive to said determination, allocating a buffer in said local memory; and initiating a first transfer of data between said local memory and said first device.

16. The computer program product of claim 15, wherein said program instructions for determining further determine that said local memory has second degree of efficiency with a second device and further comprising program instructions for initiating a second transfer of data between said local memory and said second device.

17. The method of claim 16, further comprising program instructions that, in response to completion said first transfer, modify data in said buffer before initiating said second transfer.

18. The computer program product of claim 16, wherein said first device and said second device and said local memory are coupled to a local bus separated from said global system bus by a common bus bridge said program instructions determine that said local memory has a high efficiency with said first device and a high efficiency with said second device in conformity with the coupling of said first device and said second device to said local bus.

19. The computer program product of claim 16, wherein said program instructions deallocate said buffer responsive to the completion of said second transfer.

20. The computer program product of claim 15, wherein said first device is a bus master and said program instructions initiate said first transfer by setting said first device to perform transfers with said local memory.

21. The computer program product of claim 15, wherein said computer system further comprises DMA controller means coupled to said local bus and said program instructions initiate said first transfer by setting said DMA controller to transfer data between said first device and said local memory.

22. A method for performing direct memory access (DMA) transfers in a computer system having a local bus coupled to a device located on an adapter, comprising:

determining whether said device and a local memory are both present on said adapter;

determining whether said local memory located on said adapter coupled to said local bus is available;

responsive to said determination that said local memory is available, allocating a buffer in said local memory on said adapter; and transferring data between said buffer and said device.

23. The method of claim 22, wherein said local memory is coupled to said local bus, said device is further coupled to said local bus, said determining step determines that said device and said local memory are coupled to said local bus, and said allocating step allocates said buffer from said local memory.

24. The method of claim 22, further comprising the step of responsive to said determination, if said local memory is not available, allocating said buffer from system memory.

* * * * *